United States Patent [19]

Morningstar et al.

[11] Patent Number: 5,367,499
[45] Date of Patent: Nov. 22, 1994

[54] VIBRATION ISOLATION MODULE FOR TOWED HYDROPHONE STREAMER

[75] Inventors: Charles L. Morningstar, Lewisville; Tracy G. Gill, The Colony, both of Tex.

[73] Assignee: Whitehall Corporation, Dallas, Tex.

[21] Appl. No.: 126,305

[22] Filed: Sep. 23, 1993

[51] Int. Cl.$^5$ .......................... G01V 1/38; B63B 21/00
[52] U.S. Cl. ........................ 367/154; 367/20; 174/101.5
[58] Field of Search ................ 367/20, 153, 154; 174/101.5, 42; 114/242, 247, 253

[56] References Cited

U.S. PATENT DOCUMENTS

| | | | |
|---|---|---|---|
| 2,614,143 | 10/1952 | Williams | 327/171 |
| 2,708,742 | 5/1955 | Harris | 340/7 |
| 2,782,059 | 2/1957 | Stranberg | 285/247 |
| 2,900,536 | 8/1959 | Palo | 310/9.6 |
| 3,177,016 | 4/1965 | Holmgren | 285/247 |
| 3,258,739 | 6/1966 | Hurley | 340/10 |
| 3,333,236 | 7/1967 | Schloss | 340/8 |
| 3,418,624 | 12/1968 | Massa | 340/9 |
| 3,648,226 | 3/1972 | Fitzpatrick et al. | 114/242 |
| 3,739,326 | 6/1973 | Kerr et al. | 340/7 |
| 3,764,848 | 10/1973 | Berlincourt | 315/55 |
| 3,996,554 | 12/1976 | Siems et al. | 340/15 |
| 4,012,649 | 3/1977 | Cook et al. | 310/8.3 |
| 4,090,168 | 5/1978 | Miller et al. | 174/101.5 |
| 4,092,629 | 5/1978 | Siems et al. | 340/15 |
| 4,160,229 | 7/1979 | McGough | 340/7 |
| 4,204,188 | 5/1980 | Weichart et al. | 367/154 |
| 4,437,689 | 3/1984 | Goebel et al. | 285/246 |
| 4,491,939 | 1/1985 | Carpenter | 367/20 |
| 4,628,851 | 12/1986 | Appling | 114/253 |
| 4,660,183 | 4/1987 | McGowan et al. | 367/15 |
| 4,733,379 | 3/1988 | Lapetina et al. | 367/20 |
| 4,736,969 | 4/1988 | Fouts | 285/247 |
| 4,782,470 | 11/1988 | Poturnicki et al. | 367/157 |
| 4,787,069 | 11/1988 | Beauducel et al. | 367/21 |
| 4,819,216 | 4/1989 | Fraioli | 367/154 |
| 4,901,287 | 2/1990 | Hathaway et al. | 367/3 |
| 4,951,265 | 8/1990 | Buckles | 367/18 |
| 5,008,581 | 4/1991 | Kumada et al. | 310/323 |
| 5,062,085 | 10/1991 | Andrews, Jr. | 367/20 |

FOREIGN PATENT DOCUMENTS

| | | |
|---|---|---|
| 2137750 | 10/1984 | United Kingdom . |
| 2145226 | 3/1985 | United Kingdom . |

OTHER PUBLICATIONS

Proffitt, Jack M. "A History of Innovation in Marine Seismic Data Acquisition", *Geophysics: The Leading Edge of Exploration*, p. 24 (Mar. 1991).

Primary Examiner—Jan J. Lobo
Attorney, Agent, or Firm—Konneker Bush Hitt & Chwang

[57] ABSTRACT

Disclosed is a vibration isolation module for a towed hydrophone streamer comprising: (1) a first outboard transition unit having an outboard end and an inboard end, the outboard end of the first outboard unit capable of receiving a first tension member, the first tension member terminating within the first outboard unit, the inboard end of the first outboard unit capable of receiving second and third tension members, the second tension member entering, looping back and exiting the inboard end of the first outboard unit, the third tension member terminating within the first outboard unit and (2) a first inboard transition unit having an outboard end and an inboard end, the outboard end of the first inboard unit capable of receiving the second and third tension members, the second tension member passing through the first inboard unit, the third tension member terminating within the first inboard unit, the inboard end of the first inboard unit capable of receiving a fourth tension member, the fourth tension member entering, looping back and exiting the inboard end of the first inboard unit.

39 Claims, 4 Drawing Sheets

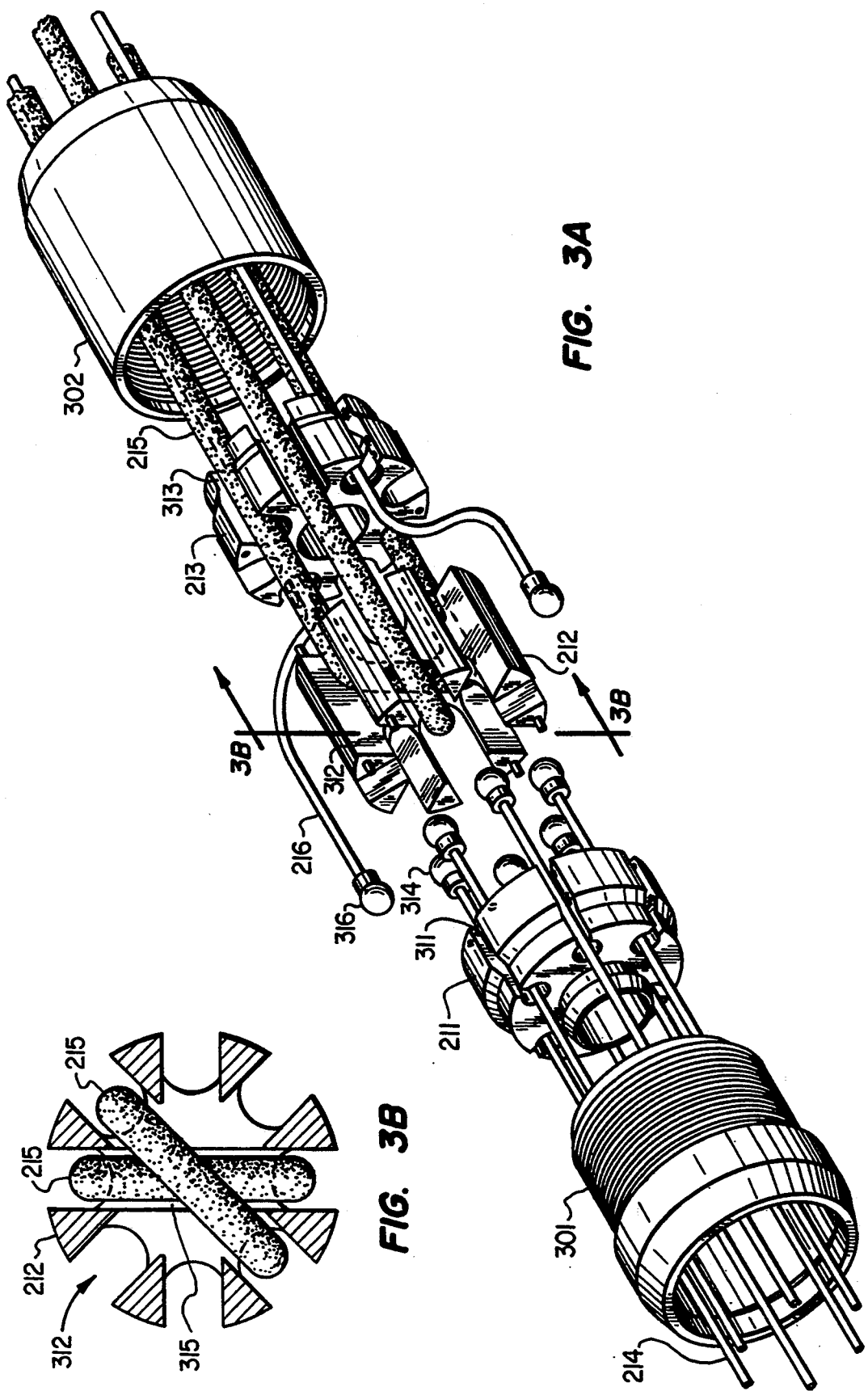

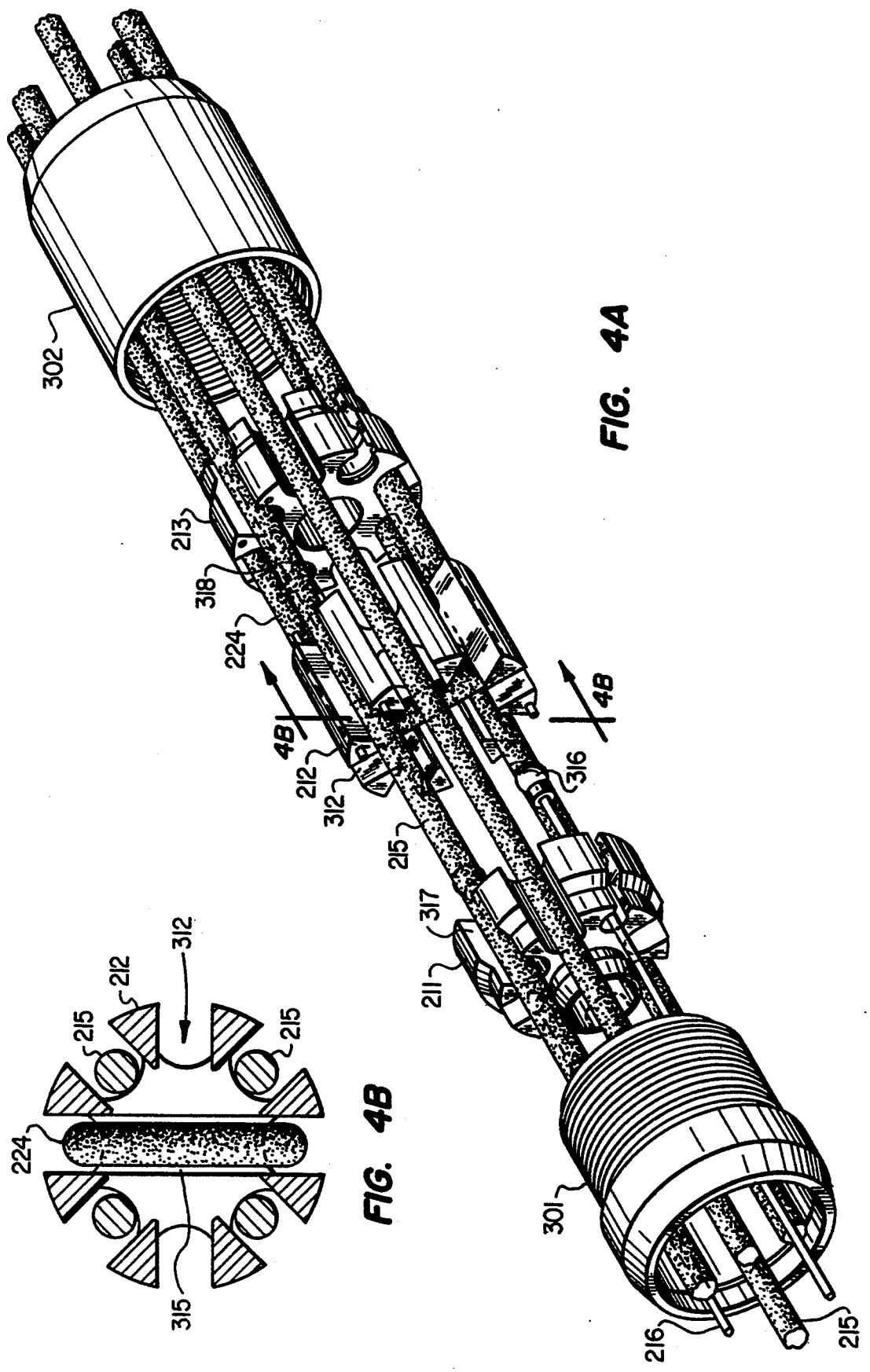

VIBRATION ISOLATION MODULE FOR TOWED HYDROPHONE STREAMER

TECHNICAL FIELD OF THE INVENTION

The present invention is directed, in general, to towed hydrophone streamers and, more specifically, to a compact vibration isolation module designed to damp vibration that may distort telemetry signals produced by the hydrophones.

BACKGROUND OF THE INVENTION

It is now common practice to explore the oceans of the earth for deposits of oil, gas and other valuable minerals by seismic techniques in which an exploration vessel imparts an acoustic wave into the water, typically by use of a compressed air "gun". The acoustic wave travels downwardly into the sea bed and is reflected at the interfaces between layers of materials having varying acoustic impedances. The wave travels back upwardly where it is detected by microphone or "hydrophone" elements in a streamer or array towed by the vessel to yield information regarding characteristics of the underwater material and structures.

A towed acoustic array typically comprises a plurality of pressure-sensitive hydrophone elements enclosed within a waterproof sheath and electrically coupled to recording equipment onboard the vessel. Each hydrophone element within the towed array is designed to convert the mechanical energy present in pressure variations surrounding the hydrophone element into electrical signals. Most typically, this is done by constructing the hydrophone of a piezoelectric material, such as lead zirconate titanate ("PZT") and a means by which to amplify pressure variations to obtain the strongest possible signal (often by one or more diaphragms acting as tympanic collectors). The hydrophone elements are typically provided with leads or contacts to which to join electrical conductors, the electrical conductors carrying signals from the hydrophone elements to the recording equipment.

A typical towed array is taught in U.S. Pat. No. 4,160,229, which issued on Jul. 3, 1979, directed to a hydrophone streamer apparatus embodying concentric tube construction for achieving improved low noise operation. A plurality of hydrophone elements are supported within a compliant inner tube at spaced intervals therealong by rather complicated compliant mounting means. The inner tube is supported within an elongated outer jacket by compliant support means between the outer surface of the inner tube and the inner surface of the jacket. Suitable support means may comprise a plurality of trilobate devices each formed of three tubular sections equally spaced around the inner tube, the trilobate devices being located along the inner tube at positions between adjacent transducer elements.

The signals that hydrophones produce are of extremely low level. This is because the pressure signals that impinge on the hydrophones are weak, the hydrophones themselves are high impedance devices and the volume of piezoelectric material in hydrophones is minimized for cost reasons. Thus, it is very important to limit unwanted noise to preserve the faint signals.

Unfortunately, during operation, hydrophones encounter acoustic noise produced by a wide variety of sources emanating from the surrounding ocean, such as surface ocean waves striking the streamer or its towing vessel, propeller noise or swell noise from the towing vessel or even volcanos. Moreover, the towing cables leading from the vessel may strum as they are dragged through the water. The noise these sources produce lies mostly in the range below 10 Hz, increasing dramatically as the frequency approaches 0 Hz. The valid acoustic signals reflected back from the ocean floor tend to lie in a range from a few Hz to several hundred Hz.

In an effort to make the most use of available bandwidth of the data buses and to improve the hydrophone signal to noise ratio, it therefore becomes highly advantageous to filter out the noise. This frees the buses of the burden of carrying data pertaining to the noise, allowing that bandwidth to be spent instead on a higher resolution of the data pertaining to the remaining higher frequencies.

One of the ways to provide such filtering is to isolate the streamer from the towing vessel. Any structure-borne noise that the towing vessel generates (by its propeller or swell) is thus attenuated before it reaches the streamer. This isolation has been done by inserting a vibration isolation module ("VIM") at a forward end of the streamer (and also at the aft end, if a terminating buoy or rope drogue is used).

The most basic type of VIM is a loss type and employs one or more elastic ropes, acting as low-pass filters. The ropes allow constant towing forces to be transmitted to the streamer, while intermittent-energy vibrations are attenuated therein, dissipated as heat energy in the ropes. Another type of VIM is a stop band type and employs structures having different vibration propagation velocities and interfaces that create reflections, causing superpositions at selected frequencies that damp those frequencies. Stop band VIMs are relatively expensive and are limited in their ability to provide broadband filtering. Thus, for most applications, loss type VIMs are preferred.

The earliest loss type VIM employed a single length of lossy rope (a "primary rope") to attenuate vibration. The lossy rope was either of a natural fiber in the earliest embodiments or a manmade elastomer or polymer in more recent embodiments. While this was suitable for the purpose of attenuating vibration, towing force transients (such as those resulting as the towing vessel pitches in rough seas) occasionally caused the single lossy rope to stretch past the point at which it can return to its original length and flexibility. Over time, this altered the lossy rope's damping characteristics, decreasing the effectiveness of the VIM.

One step toward solving this problem was to add a second lossy rope (a "secondary rope") that only came into play when the towing force exceeded a first limit. The secondary rope introduced more resistance to stretching and, hence, changed the response of the VIM to vibration. Unfortunately, extreme towing force transients still distended both the primary and secondary ropes, forever changing their ability to filter out vibrations.

The most recent step toward solving this problem has been to provide a third rope (a "stopper rope") in the VIM. However, this rope differs from the primary and secondary ropes in that the stopper rope is extremely strong and relatively nonextensible. The function of the stopper rope is to carry towing force transients that would otherwise distend the primary and secondary ropes. Because the stopper rope is relatively nonextensible, it is not lossy and vibrations pass through to the module. However, the stopper rope is not designed to carry forces under normal operation of the streamer, and that it is better to vibrate the streamer for a short time rather than to harm the VIM long term.

These three-rope lossy VIMs have been implemented in deepwater streamers having a diameter of at least 2.8 inches by providing three rope loops, pulleys at either end of the VIM receiving the rope loops and transferring towing forces and vibration into the rope loops as desired. Since the pulleys acted to transition energy into the ropes, they are called "transitions." The pulleys were of a conventional side-by-side design, existing as a block.

As mentioned, deepwater seismic streamers have had a diameter of at least 2.8 inches, although some small streamers of limited capability and employed for specialized work have been of less diameter. This large diameter was necessary to house larger, stronger strain cables and larger diameter hydrophones. This larger diameter posed a storage problem, as such streamers are typically more than 3 km long. The sheer volume of the streamer and handling equipment exacerbated the modern practice of towing multiple streamers in an array. Further, as damaged modules must be shipped to repair sites, the larger diameter posed a shipping problem.

It has thus become very advantageous to provide a thinner streamer (of only 2 inches in diameter, for example). Unfortunately, the prior art scheme employing side-by-side pulleys in a three-rope VIM cannot be reduced to the desired 2 inch maximum diameter. What is needed in the art is a three-rope lossy VIM having narrow, more volume-efficient transitions therein.

SUMMARY OF THE INVENTION

To address the above-discussed deficiencies of the prior art, it is a primary object of the present invention to provide a vibration isolation module having primary and secondary damping ropes and a stopper rope, the entire module fitting within a 2 inch diameter jacket. The module must also provide space for an electrical bus to pass therethrough, the streamer requiring the bus to transmit telemetry data from the hydrophones in the streamer to the towing vessel. Because of the extremely small jacket diameter, the prior art scheme of employing multiple pulleys for the rope loops is unavailable. Therefore, the present invention must overcome the problem of fitting the functionality and strength of multiple pulleys into a much smaller space.

In the attainment of the primary object, the present invention provides a vibration isolation module for a towed hydrophone streamer comprising: (1) a first outboard transition unit having an outboard end and an inboard end, the outboard end of the first outboard unit capable of receiving a first tension member, the first tension member terminating within the first outboard unit, the inboard end of the first outboard unit capable of receiving second and third tension members, the second tension member entering, looping back and exiting the inboard end of the first outboard unit, the third tension member terminating within the first outboard unit and (2) a first inboard transition unit having an outboard end and an inboard end, the outboard end of the first inboard unit capable of receiving the second and third tension members, the second tension member passing through the first inboard unit, the third tension member terminating within the first inboard unit, the inboard end of the first inboard unit capable of receiving a fourth tension member, the fourth tension member entering, looping back and exiting the inboard end of the first inboard unit.

In the disclosed embodiment, the module is symmetrical about its axial centerline. Therefore, the module further comprises: (1) a second inboard transition unit having an outboard end and an inboard end, the inboard end of the second inboard unit capable of receiving the second and fourth tension members, the fourth tension member entering, looping back and exiting the inboard end of the second inboard unit, the second tension member passing through the second inboard unit, the outboard end of the second inboard unit capable of receiving a fifth tension member, the fifth tension member terminating within the second inboard unit and (2) a second outboard transition unit having an outboard end and an inboard end, the inboard end of the second outboard unit capable of receiving the second and fifth tension members, the second tension member entering, looping back and exiting the inboard end of the second outboard unit, the fifth tension member terminating within the second outboard unit, the outboard end of the second outboard unit capable of receiving a sixth tension member, the sixth tension member terminating within the second outboard unit.

The units transition towing forces (including vibration) between the tension members and the units in the module. The generic term "tension member" is defined to include both cables and ropes, whether they be extensible or nonextensible. It is an object of the present invention to damp vibration in the second and fourth tension members. Therefore, in a preferred embodiment, the first, third, fifth and sixth tension members are relatively inextensible metal cable, while the second and fourth tension members comprise relatively extensible rope, such as Nylon rope, and relatively inextensible stopper rope, such as Kevlar rope. The second and fourth tension members may have different moduli of elasticity or be cut to different length to provide the necessary damping characteristics. In the disclosed embodiment, the fourth tension member is shorter than the second, yielding a stiffer damping characteristic when the moduli of elasticity of the second and fourth tension members are the same.

The first and second outboard transition units each comprise: (1) a primary block having a substantially cylindrical cross-section, the primary block capable of receiving a first plurality of tension members into axial channels in the primary block, the first plurality of tension members terminating in the primary block, (2) an intermediate block with a substantially cylindrical cross-section and axial radially-opposed pairs of axial channels therein, the intermediate block further having axially-offset crossover channels linking each of the radially-opposed channel-pairs to thereby allow one of a second plurality of tension members to pass through a first channel of one of the channel-pairs, one of the crossover channels and a radially-opposed second channel of the one of the channel-pairs, allowing the one of the plurality of tension members to loop through the intermediate block, the intermediate block capable of allowing two of the second plurality of tension members to loop therethrough free of contact between the two and (3) a secondary block with a substantially cylindrical cross-section and axial channels therein corresponding to the intermediate block axial channels, the secondary block capable of allowing ones of the second plurality of tension members to pass through the secondary block axial channels, others of the second plurality of tension members terminating in the secondary block, the primary, intermediate and secondary blocks held in a fixed relative relationship to allow tension present on the first plurality of tension members to be transferred through the primary, intermediate and secondary blocks to the second plurality of tension members.

The first and second inboard transition units each comprise: (1) a first secondary block having a substantially cylindrical cross-section and axial channels therein, the first secondary block capable of allowing ones of a second plurality of tension members to pass through the secondary block axial channels, others of the second plurality of tension members terminating in the first secondary block, (2) an intermediate block with a substantially cylindrical cross-section and axial radially-opposed pairs of axial channels therein, the intermediate block further having axial-offset crossover channels linking each of the radially-opposed channel-pairs to thereby allow a second tension member to pass through a first channel of one of the channel-pairs, one of the crossover channels and a radially-opposed second channel of the one of the channel-pairs, allowing the tension member to loop through the intermediate block, the intermediate block capable of allowing the ones of the first plurality of tension members to pass therethrough and (3) a second secondary block having a substantially cylindrical cross-section and axial channels therein, the second secondary block capable of allowing the ones of the first plurality of tension members and the second tension member to pass through the second secondary block axial channels, the first secondary, intermediate and second secondary blocks held in a fixed relative relationship to allow a portion of tension present on the first plurality of tension members to be transferred through the primary, intermediate and secondary blocks to the second tension member.

Thus, as can be seen, the outboard and inboard units are substantially similar to one another and employ, with one exception, the same interchangeable parts. While the outboard units employ primary, intermediate and secondary blocks, the inboard units employ two secondary and an intermediate block. Thus, the intermediate and secondary blocks have been made generic to the separate functions of the outboard and inboard blocks.

As previously described, a hydrophone streamer is surrounded by water during operation. The vibration isolation module is no exception. Thus, to preserve the integrity of the vibration isolation module of the present invention, a waterproof jacket surrounds the units and the tension members to prevent saltwater from harming those components. Furthermore, in the illustrated embodiment, a fill fluid is introduced into the jacket and surrounds the units and tension members to give the module a near-neutral buoyancy with respect to saltwater and to slow the invasion of saltwater should it occur.

Finally, since hydrophone streamers are electrical devices and are linked to the towing vessel or seismic exploration vehicle, the vibration isolation module should accommodate an electrical bus therethrough. Accordingly, in a preferred embodiment, the outboard and inboard ends of the first outboard and inboard units have a radially central bore to accept an electrical bus through the units.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3A illustrates an isometric view of an outboard transition unit of the present invention;

FIG. 3B illustrates a sectional view of the outboard transition unit of FIG. 3A taken along lines 3B—3B;

FIG. 4A illustrates an isometric view of an inboard transition unit of the present invention;

FIG. 4B illustrates a sectional view of the inboard transition unit of FIG. 4A taken along lines 4B—4B;

DETAILED DESCRIPTION

Figure 1:
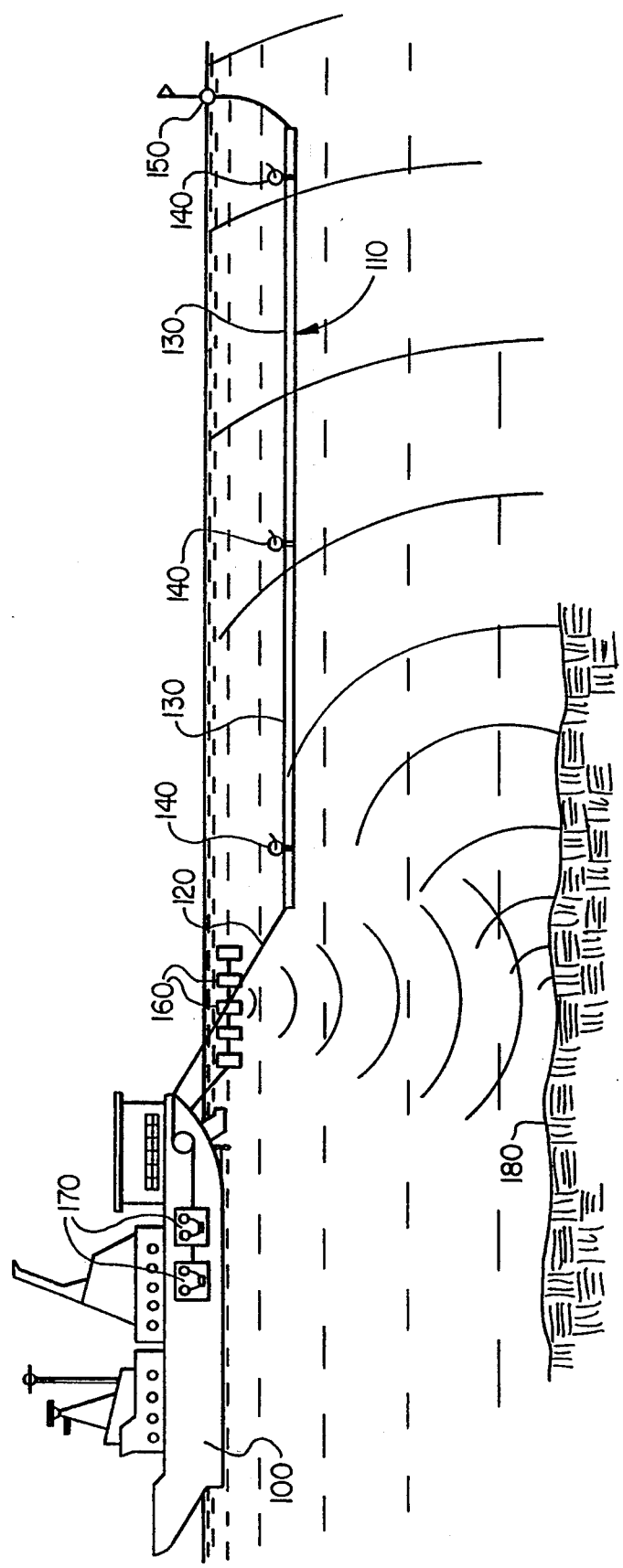
FIG. 1 illustrates an elevational view representing a towed array in operation.

Referring initially to FIG. 1, illustrated is an elevational view representing a towed array in operation. A seismic exploration vehicle 100 tows a streamer 110 behind it by way of a tow cable 120. The streamer 110 may comprise a rear buoy 150 if necessary. The streamer 110 is additionally provided with one or more leveling devices or "birds" 140 which serve to regulate the depth of the streamer 110 within the water. The seismic vessel also tows compressed air guns 160 or other sources of acoustic energy which generate an acoustic wave in the water which travels downwardly as shown, reflects at interfaces within the sea bed 180 and is detected by the hydrophones of the streamer 110. As described in more detail below, the analog signals generated by the hydrophones within the streamer 110 upon receipt of the reflected wave are converted to digital format by analog-to-digital converters also comprised in the streamer 110 and are transmitted in digital form along the streamer 110 and up the tow cable 120 to be recorded by digital recording devices 170 on board the ship 100. The streamer 110 comprises a plurality of modules 130. Each module 130 comprises a plurality of hydrophone assemblies (individually referenced in FIG. 2). The modules 130 are connectible to each other in various numbers to make the streamer 110 any length desired, up to a practical maximum length. The frontmost and aftmost modules are preferably vibration isolation modules ("VIM"s), not containing hydrophones.

Figure 2:
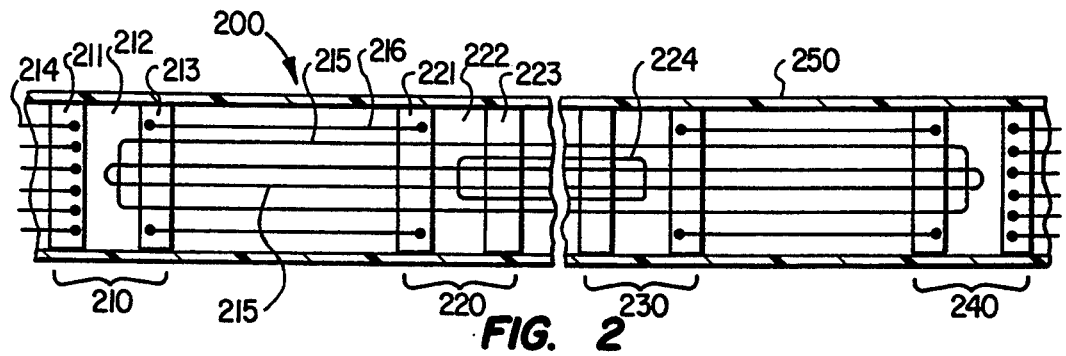
FIG. 2 illustrates a schematic diagram of the vibration isolation module of the present invention.

Turning now to FIG. 2, illustrated is a schematic diagram of the VIM of the present invention. The VIM, generally designated 200, comprises a first outboard transition unit 210, a first inboard transition unit 220, a second inboard transition unit 230 and a second outboard transition unit 240. Each transition unit 210, 220, 230, 240 effects a transition of towing forces and vibration from one set of tension members to another and is implemented as a three-block set, schematically represented by separation of the units by vertical lines into three blocks each.

The first outboard unit 210 comprises a primary block 211, an intermediate block 212 and a secondary block 213. The primary block is capable of receiving a first plurality of tension members 214 into axial channels in the primary block (not shown in FIG. 2). The first plurality of tension members 214 terminate in the primary block 211 as shown. The intermediate block 212 allows two of a second plurality of tension members 215 to loop through the intermediate block 212, the intermediate block capable of allowing the two tension members to loop therethrough free of contact between the two. This is a significant feature of the present invention. As will be described with reference to later FIGUREs, the intermediate block 212 provides a plurality of crossover channels that are axially offset with respect to one another. This allows one tension member to cross over another one at a radially central point in the intermediate block 212 without the two tension members coming into contact with one another. This prevents the two from abrading one another during operation of the VIM 200, extending their useful life.

The secondary block 213 is capable of allowing the ones of the second plurality of tension members 215 to pass through the secondary block 213, others of the second plurality of tension members 216 terminating in the secondary block. In a preferred embodiment, the first plurality of tension members 214 are metal cables, ones of the second plurality of tension members 215 are ropes looping through the first outboard unit 210 and the others of the second plurality of tension members 216 are metal cables.

The first inboard transition unit each comprises a first secondary block 221, preferably of identical construction to the secondary block 213. The first secondary block 221 is capable of allowing the ones of the second plurality of tension members 215 to pass through the secondary block (as shown) and the others of the second plurality of tension members 216 to terminate in the first secondary block 221. Thus, the others of the second plurality of tension members 216 function to maintain a desired distance between the first outboard unit 210 and the first inboard unit 220. An intermediate block 222 allows a third tension member 224 to loop therethrough without coming into contact with either of the ones of the second plurality of tension members 215. Finally, a second secondary block 223 is capable of allowing the ones of the second plurality of tension members 215 and the third tension member 224 to pass through the second secondary block 223. In a preferred embodiment, the ones of the second plurality of tension members 215 are the primary and stopper ropes, while the third tension member 224 is the secondary rope, although other permutations are possible and within the scope of the invention.

The second inboard and outboard units 230, 240 are of the same construction and function as the first inboard and outboard units 220, 210, respectively, as the VIM 200 is symmetrical about its centerline.

Thus, as can be seen, the outboard and inboard units 210, 220, 230, 240 are substantially similar to one another and employ, with one exception, the same interchangeable parts. While the outboard units 210, 240 employ primary, intermediate and secondary blocks each, the inboard units 220, 230 employ two secondary and an intermediate block each. Thus, the intermediate and secondary blocks have been made generic to the separate functions of the outboard and inboard blocks, decreasing the manufacturing cost of the VIM 200.

As previously described, a hydrophone streamer is surrounded by water during operation. The vibration isolation module is no exception. Thus, to preserve the integrity of the vibration isolation module of the present invention, a waterproof jacket 250 surrounds the units and the tension members to prevent saltwater from harming those components. Furthermore, in the illustrated embodiment, a fill fluid is introduced into the jacket and surrounds the units and tension members to give the module a near-neutral buoyancy with respect to saltwater and to slow the invasion of saltwater should it occur.

Turning now to FIG. 3A, illustrated is an isometric view of an outboard transition unit (for instance, the first outboard unit 210) of the present invention. The primary block 211 is provided with a plurality of axial channels 311 disposed regularly about a perimeter of the primary block 211. The channels 311 receive the first plurality of tension members 214 (preferably metal cables). The tension members 214 terminate in the primary block 211. This is done by providing endcaps 314 on the members 214. The endcaps 314 are of a diameter that captures them within the channels 311 in a manner to be later described. Likewise, endcaps 316 terminate the others of the second plurality of tension members 216, allowing them to be captured in certain ones of channels 313 in the secondary block 213. First and second housing members 301, 302 cooperate to fix the primary, intermediate and secondary blocks 211, 212, 213 in a relative fixed relationship to one another, allowing towing forces to be transmitted from the primary block 211 to the intermediate block 212 and the secondary block 213. Shown but not referenced in FIG. 3A are central bores in the primary and secondary blocks 211, 213 allowing an electrical bus to pass through the outboard unit. Since the intermediate block 212 does not have a central bore (by virtue of the cross-channeling of the tension members in the center thereof), the electrical bus must split, occupying unused channels 312 of the intermediate block 212.

Turning now to FIG. 3B, illustrated is a sectional view of the outboard transition unit of FIG. 3A taken along lines 3B—3B. FIG. 3B is presented primarily for the purpose of showing that the ones of the second plurality of tension members 215 enter one of a radially-opposed pair of channels defined in the intermediate block, cross over to an opposite of the pair of channels and exit the intermediate block via the opposite channel. Axially offset crossover channels 315 are defined in the intermediate block 212 structure, allowing multiple crossovers to take place without the various tension members coming into contact with one another.

Turning now to FIG. 4A, illustrated is an isometric view of an inboard transition unit (for instance, the first inboard unit 220) of the present invention. The intermediate block 212 is provided with reference numerals corresponding to the primary block of FIG. 3A. This is because of the identical relative positions of the primary and first secondary blocks within the first outboard and inboard units, respectively. The first secondary block 211 is provided with a plurality of axial channels 311 disposed regularly about a perimeter of the first secondary block 211. The channels 311 receive the second plurality of tension members 215, 216, allowing the ones of the second plurality 215 to pass through the first secondary block 211, the others (namely cables) of the second plurality 216 terminate in certain of the channels with endcaps 314. Again, the endcaps 314 are of a diameter that captures them within the channels 311 in a manner to be later described. The ones of the second plurality of tension members 215 continue to pass through the intermediate block 212.

First and second housing members 301, 302 cooperate to fix the first secondary, intermediate and second secondary blocks 211, 212, 213 in a relative fixed relationship to one another, allowing towing forces to be transmitted from the first secondary block 211 to the intermediate block 212 and the second secondary block 213. The second secondary block 213 allows all tension members to pass therethrough. Shown but not referenced in FIG. 4A are central bores in the first secondary and second secondary blocks 211, 213 allowing an electrical bus to pass through the inboard unit. Again, since the intermediate block 212 does not have a central bore (by virtue of the cross-channeling of the tension member in the center thereof), the electrical bus must split, occupying unused channels 312 of the intermediate block 212.

A third tension member 224 is shown as entering, crossing over and exiting the intermediate block 312 in one of the previously unused channel-pairs.

Turning now to FIG. 4B, illustrated is a sectional view of the inboard transition unit of FIG. 4A taken along lines 4B—4B. FIG. 4B is again presented primarily for the purpose of showing that the third tension member 224 enters one of a radially-opposed pair of channels defined in the intermediate block, crosses over to an opposite of the pair of channels and exits the intermediate block 212 via the opposite channel. Again, the intermediate block 212 provides offset crossover channels 313 that are defined in the intermediate block 212 structure, allowing the crossover to take place without the various tension members coming into contact with one another.

Figure 5B:
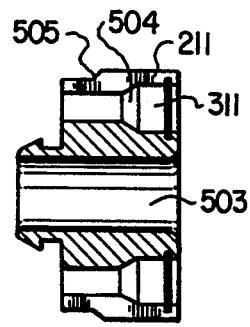
FIG. 5B illustrates a sectional view of the primary block of FIG. 5A taken along lines 5B—5B.
Figure 5A:
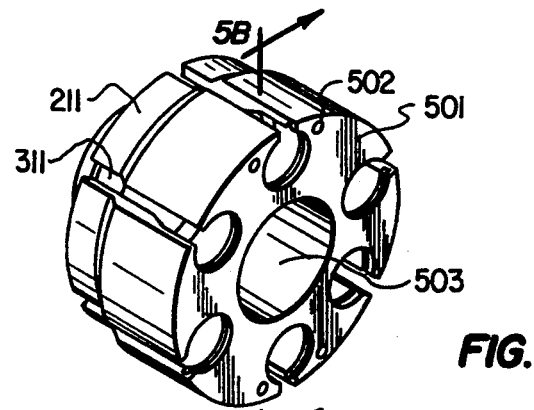
FIG. 5A illustrates an isometric view of a primary block of the present invention.

Turning now to FIG. 5A, illustrated is an isometric view of the primary block 211 of the present invention. A plurality of axial channels 311 are formed in a perimeter of the primary block 211. The axial channels 311 receive and capture the first plurality of tension members 214 as previously described. An inboard mating face 501 is adapted to mate with an outboard mating face of the intermediate block (not shown). Alignment bores 502 receive alignment pins on the intermediate block to prevent relative rotation between the two. A central bore 503 allows an electrical bus (not shown) to pass through the primary block.

Turning now to FIG. 5B, illustrated is a sectional view of the primary block 211 of FIG. 5A taken along lines 5B—5B. The channels 311 have a portion of reduced inside diameter 504 designed to capture the endcaps on the ends of the first plurality of tension members (not shown). This allows the first plurality of tension members to transmit towing force and vibration to the primary block 211. A shoulder 505 allows the primary block 211 to be captured within the housing members 301, 302 of FIG. 3A.

Figure 6A:
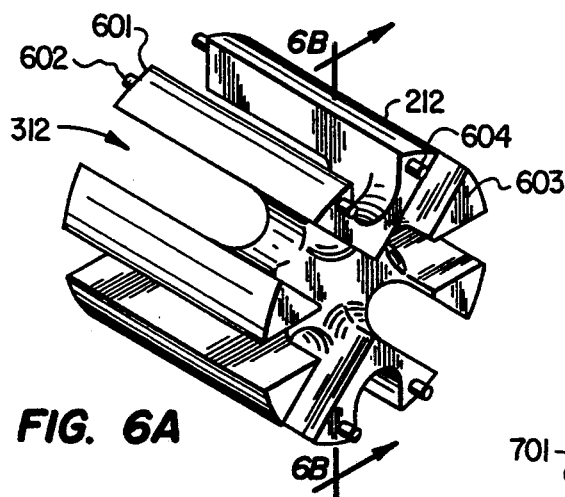
FIG. 6A illustrates an isometric view of an intermediate block of the present invention.

Turning now to FIG. 6A, illustrated is an isometric view of an intermediate block 212 of the present invention. In contrast to the primary block 311 of FIG. 5, the intermediate block has eight channels 312 spaced regularly about its circumference. An outboard mating face 601 is fitted with alignment pins 602 and is adapted to mate with the inboard mating face 501 and corresponding alignment bores 502 of the primary block 211 if the intermediate block 212 is employed in an outboard unit. If the intermediate block 212 is employed in an inboard unit, the outboard mating face 601 is adapted to mate with an inboard mating face and alignment bores in a first secondary block. An inboard mating face 603 has alignment pins 604 designed to mate with a secondary block (a second secondary block if employed in an inboard unit.

Figure 6B:
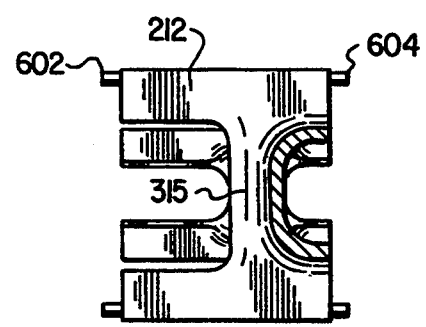
FIG. 6B illustrates a sectional view of the intermediate block of FIG. 6A taken along lines 6B—6B.

Turning now to FIG. 6B, illustrated is a sectional view of the intermediate block of FIG. 6A taken along lines 6B—6B. Particularly important in FIG. 6B is to note that the crossover channels 315 are axially offset with respect to one another, left to right as shown in FIG. 6B. This allows the various tension members to cross over within the intermediate block 212 without coming into contact with one another.

Figure 7B:
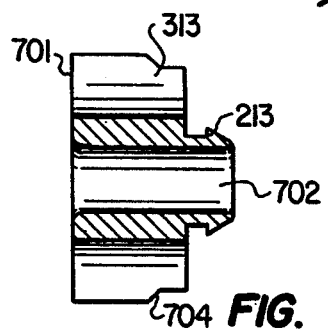
FIG. 7B illustrates a sectional view of the secondary block of FIG. 7A taken along lines 7B—7B.
Figure 7A:
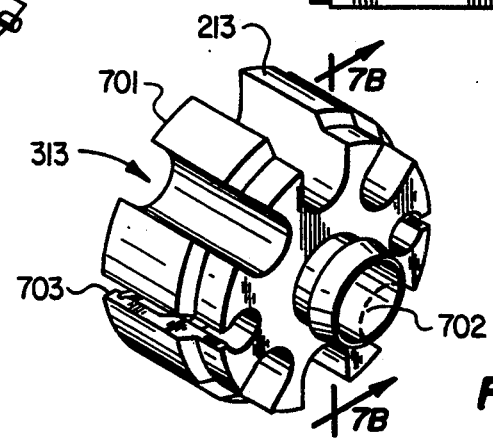
FIG. 7A illustrates an isometric view of a secondary block of the present invention.

Turning now to FIG. 7A, illustrated is an isometric view of the second secondary block 213 of the present invention. A plurality of axial channels 313 are formed in a perimeter of the second secondary block 213 and are of relatively wide diameter to allow the ones of the second plurality of tension members 215 and the third tension member 224 to pass therethrough. An opposing pair of the axial channels 703 receive and capture the others of the second plurality of tension members 216 (of FIG. 2) as previously described. An outboard mating face 701 is adapted to mate with an inboard mating face 603 of the intermediate block 212 (of FIG. 6) when the second secondary block 213 is employed in an outboard unit. When the secondary block 213 is employed as a first secondary block in an inboard unit, the outboard mating face 701 is actually inboard and mates with the outboard mating face 601 of the intermediate block 212. Alignment bores (not shown) receive alignment pins on the intermediate block to prevent relative rotation between the two. A central bore 702 allows an electrical bus (not shown) to pass through the secondary block.

Turning now to FIG. 7B, illustrated is a sectional view of the secondary block of FIG. 7A taken along lines 7B—7B. A shoulder 704 allows the secondary block 213 to be captured within the housing members 301, 302 of FIG. 3A.

In a preferred embodiment, the jacket and the primary ropes (part of the one of the second plurality of tension members) collectively oppose an initial load up to a predetermined, low percentage of the maximum designed stress. Beyond this point, a combination of the jacket and the primary and secondary ropes (the fourth tension members) share the stress up to a predetermined, greater percentage of the maximum designed stress. This staggered and overlapping inclusion of strain members as stress increases continues until the stopper ropes (another part of the one of the second plurality of tension members) engage short of the VIM's overall elastic limit. As the stress decreases, the process reverses itself systematically.

The metal cables (the first plurality of tension members and the other of the second plurality of tension members) are preferably of stainless steel. The housing members and primary, intermediate and secondary blocks are preferably made of titanium, due to the extreme amount of force placed thereon. If used in the inboard units, however, the intermediate block does not have to be as strong, and can be of fiberglass.

From the above, it is apparent that the present invention provides a vibration isolation module for a towed hydrophone streamer comprising: (1) a first outboard transition unit having an outboard end and an inboard end, the outboard end of the first outboard unit capable of receiving a first tension member, the first tension member terminating within the first outboard unit, the inboard end of the first outboard unit capable of receiving second and third tension members, the second tension member entering, looping back and exiting the inboard end of the first outboard unit, the third tension member terminating within the first outboard unit and (2) a first inboard transition unit having an outboard end and an inboard end, the outboard end of the first inboard unit capable of receiving the second and third tension members, the second tension member passing through the first inboard unit, the third tension member terminating within the first inboard unit, the inboard end of the first inboard unit capable of receiving a fourth tension member, the fourth tension member entering, looping back and exiting the inboard end of the first inboard unit.

Although the present invention and its advantages have been described in detail, it should be understood that various changes, substitutions and alterations can be made herein without departing from the spirit and scope of the invention as defined by the appended claims.

What is claimed is:

1. A vibration isolation module for a towed hydrophone streamer, comprising:
    a first outboard transition unit having an outboard end and an inboard end, said outboard end of said first outboard unit capable of receiving a first tension member, said first tension member terminating within said first outboard unit, said inboard end of said first outboard unit capable of receiving second and third tension members, said second tension member entering, looping back and exiting said inboard end of said first outboard unit, said third tension member terminating within said first outboard unit; and
    a first inboard transition unit having an outboard end and an inboard end, said outboard end of said first inboard unit capable of receiving said second and third tension members, said second tension member passing through said first inboard unit, said third tension member terminating within said first inboard unit, said inboard end of said first inboard unit capable of receiving a fourth tension member, said fourth tension member entering, looping back and exiting said inboard end of said first inboard unit.

2. The module as recited in claim 1 further comprising:
    a second inboard transition unit having an outboard end and an inboard end, said inboard end of said second inboard unit capable of receiving said second and fourth tension members, said fourth tension member entering, looping back and exiting said inboard end of said second inboard unit, said second tension member passing through said second inboard unit, said outboard end of said second inboard unit capable of receiving a fifth tension member, said fifth tension member terminating within said second inboard unit; and
    a second outboard transition unit having an outboard end and an inboard end, said inboard end of said second outboard unit capable of receiving said second and fifth tension members, said second tension member entering, looping back and exiting said inboard end of said second outboard unit, said fifth tension member terminating within said second outboard unit, said outboard end of said second outboard unit capable of receiving a sixth tension member, said sixth tension member terminating within said second outboard unit.

3. The module as recited in claim 2 wherein said first, third, fifth and sixth tension members are relatively inextensible metal cable.

4. The module as recited in claim 1 wherein said second and fourth tension members comprise relatively extensible rope and relatively nonextensible rope.

5. The module as recited in claim 1 wherein said second and fourth tension members have different moduli of elasticity.

6. The module as recited in claim 1 wherein said first and second outboard and inboard units each comprise an intermediate block with a substantially cylindrical cross-section and axial radially-opposed pairs of axial channels therein, said intermediate block further having axially-offset crossover channels linking each of said radially-opposed channel-pairs to thereby allow a tension member to pass through a first channel of one of said channel-pairs, one of said crossover channels and a radially-opposed second channel of said one of said channel-pairs, allowing said tension member to loop through said intermediate block, said intermediate block capable of allowing two tension members to loop therethrough free of contact between said two.

7. The module as recited in claim 1 wherein said first and second outboard and inboard units each comprise a secondary block with a substantially cylindrical cross-section and axial channels therein, said secondary block capable of allowing tension members to pass through said secondary block axial channels, said secondary block further allowing tension members to terminate in said secondary block.

8. The module as recited in claim 1 wherein said first and second outboard and inboard units each comprise a plurality of blocks surrounded and held in a fixed relative relationship by a housing.

9. The module as recited in claim 1 wherein a waterproof jacket surrounds said units and said tension members.

10. The module as recited in claim 1 wherein said outboard and inboard ends of said first outboard and inboard units have a radially central bore to accept an electrical bus through said units.

11. A method of providing vibration isolation for a hydrophone streamer undergoing a towing force, comprising the steps of:
    accepting said towing force and vibration into a first tension member coupled to an exploration vehicle;

transferring said towing force and said vibration into a first outboard transition unit of a vibration isolation module;

damping said vibration in a second tension member extending in a loop between said first outboard unit and a second outboard transition unit;

transferring a portion of said towing force and said vibration into a third tension member and a first inboard transition unit when said towing force exceeds a first limit;

damping said portion of said vibration in a fourth tension member extending in a loop between said first inboard unit and a second inboard transition unit, said second inboard unit coupled to said second outboard unit by a fifth tension member; and transferring said towing force to said hydrophone streamer, said vibration having been damped.

12. The method as recited in claim 11 further comprising the step of transferring said towing force and said vibration into a sixth tension member extending in a loop between said first and second outboard units when said towing force exceeds a second limit, said sixth tension member limiting a stretch of said second and fourth tension members.

13. The method as recited in claim 12 wherein said first, third, fifth and sixth tension members are relatively inextensible metal cable.

14. The method as recited in claim 11 wherein said second and fourth tension members comprise relatively extensible rope and relatively nonextensible rope.

15. The method as recited in claim 11 wherein said second and fourth tension members have different moduli of elasticity.

16. The method as recited in claim 11 wherein said first and second outboard and inboard units each comprise an intermediate block with a substantially cylindrical cross-section and axial radially-opposed pairs of axial channels therein, said intermediate block further having axially-offset crossover channels linking each of said radially-opposed channel-pairs to thereby allow a tension member to pass through a first channel of one of said channel-pairs, one of said crossover channels and a radially-opposed second channel of said one of said channel-pairs, allowing said tension member to loop through said intermediate block, said intermediate block capable of allowing two tension members to loop therethrough free of contact between said two.

17. The method as recited in claim 11 wherein said first and second outboard and inboard units each comprise a secondary block with a substantially cylindrical cross-section and axial channels therein, said secondary block capable of allowing tension members to pass through said secondary block axial channels, said secondary block further allowing tension members to terminate in said secondary block.

18. The method as recited in claim 11 wherein said first and second outboard and inboard units each comprise a plurality of blocks surrounded and held in a fixed relative relationship by a housing.

19. The method as recited in claim 11 wherein a waterproof jacket surrounds said units and said tension members.

20. The method as recited in claim 11 wherein said outboard and inboard ends of said first outboard and inboard units have a radially central bore to accept an electrical bus through said units.

21. An outboard transition unit for a vibration isolation module, comprising:

a primary block having a substantially cylindrical cross-section, said primary block capable of receiving a first plurality of tension members into axial channels in said primary block, said first plurality of tension members terminating in said primary block;

an intermediate block with a substantially cylindrical cross-section and axial radially-opposed pairs of axial channels therein, said intermediate block further having axially-offset crossover channels linking each of said radially-opposed channel-pairs to thereby allow one of a second plurality of tension members to pass through a first channel of one of said channel-pairs, one of said crossover channels and a radially-opposed second channel of said one of said channel-pairs, allowing said one of said plurality of tension members to loop through said intermediate block, said intermediate block capable of allowing two of said second plurality of tension members to loop therethrough free of contact between said two; and a secondary block with a substantially cylindrical cross-section and axial channels therein corresponding to said intermediate block axial channels, said secondary block capable of allowing ones of said second plurality of tension members to pass through said secondary block axial channels, others of said second plurality of tension members terminating in said secondary block, said primary, intermediate and secondary blocks held in a fixed relative relationship to allow tension present on said first plurality of tension members to be transferred through said primary, intermediate and secondary blocks to said second plurality of tension members.

22. The outboard transition unit as recited in claim 21 wherein said primary block axial channels each have a portion of lesser diameter to capture an enlarged end of a corresponding one of said first plurality of tension members.

23. The outboard transition unit as recited in claim 21 wherein said ones of said secondary block axial channels each have a portion of lesser diameter to capture an enlarged end of a corresponding one of said second plurality of tension members.

24. The outboard transition unit as recited in claim 21 wherein said primary and secondary blocks each have a central axial bore therethrough for accepting an electrical conductor through said primary and secondary blocks.

25. The outboard transition unit as recited in claim 21 further comprising a tension-bearing housing surrounding said primary, intermediate and secondary blocks, said housing holding said primary, intermediate and secondary block in said fixed relative relationship.

26. The outboard transition unit as recited in claim 21 wherein said primary block has six axial channels distributed regularly about a circumference of said primary block.

27. The outboard transition unit as recited in claim 21 wherein said intermediate and secondary blocks each have eight axial channels distributed regularly about a circumference of said intermediate and secondary blocks.

28. The outboard transition unit as recited in claim 21 wherein said first plurality of tension members are relatively inextensible metal cable.

29. The outboard transition unit as recited in claim 21 wherein said secondary plurality of tension members comprise relatively extensible rope and relatively non-extensible rope.

30. The outboard transition unit as recited in claim 21 wherein corresponding alignment pins and bores in said primary, intermediate and secondary blocks prevent relative rotation therebetween.

31. An inboard transition unit for a vibration isolation module, comprising:
- a first secondary block having a substantially cylindrical cross-section and axial channels therein, said first secondary block capable of allowing ones of a first plurality of tension members to pass through said secondary block axial channels, others of said first plurality of tension members terminating in said first secondary block;
- an intermediate block with a substantially cylindrical cross-section and axial radially-opposed pairs of axial channels therein, said intermediate block further having axially-offset crossover channels linking each of said radially-opposed channel-pairs to thereby allow a second tension member to pass through a first channel of one of said channel-pairs, one of said crossover channels and a radially-opposed second channel of said one of said channel-pairs, allowing said tension member to loop through said intermediate block, said intermediate block capable of allowing said ones of said first plurality of tension members to pass therethrough; and
- a second secondary block having a substantially cylindrical cross-section and axial channels therein, said second secondary block capable of allowing said ones of said first plurality of tension members and said second tension member to pass through said second secondary block axial channels, said first secondary, intermediate and second secondary blocks held in a fixed relative relationship to allow a portion of tension present on said first plurality of tension members to be transferred through said primary, intermediate and secondary blocks to said second tension member.

32. The inboard transition unit as recited in claim 31 wherein said ones of said secondary block axial channels each have a portion of lesser diameter to capture an enlarged end of a corresponding one of said first plurality of tension members.

33. The inboard transition unit as recited in claim 31 wherein said first and second secondary blocks each have a central axial bore therethrough for accepting an electrical conductor through said first and second secondary blocks.

34. The inboard transition unit as recited in claim 31 further comprising a tension-bearing housing surrounding said first secondary, intermediate and second secondary blocks, said housing holding said first secondary, intermediate and second secondary block in said fixed relative relationship.

35. The inboard transition unit as recited in claim 31 wherein said first secondary block has eight axial channels distributed regularly about a circumference of said first secondary block.

36. The inboard transition unit as recited in claim 31 wherein said intermediate and second secondary blocks each have eight axial channels distributed regularly about a circumference of said intermediate and second secondary blocks.

37. The inboard transition unit as recited in claim 31 wherein some of said first plurality of tension members are relatively inextensible metal cable.

38. The inboard transition unit as recited in claim 31 wherein said secondary plurality of tension members comprise relatively extensible rope and relatively non-extensible rope.

39. The inboard transition unit as recited in claim 31 wherein corresponding alignment pins and bores in said first secondary, intermediate and second secondary blocks prevent relative rotation therebetween.

* * * * *